Jan. 31, 1961 P. F. GRACE ET AL 2,969,725

MOTOR VEHICLE AIR REGISTER

Filed May 28, 1957 2 Sheets-Sheet 1

P. F. GRACE
M. D. GOY
INVENTOR.

BY E. C. McRae
J. R. Faulkner
D. H. Oster

ATTORNEYS

P. F. GRACE
M. D. GOY
INVENTOR.

BY E. C. McRae
J. B. Faulkner
D. H. Oster

ATTORNEYS

United States Patent Office 2,969,725

Patented Jan. 31, 1961

1

2,969,725

MOTOR VEHICLE AIR REGISTER

Philip F. Grace, Wayne, and Michael D. Goy, Dearborn, Mich., assignors to Ford Motor Company, Dearborn, Mich., a corporation of Delaware Filed May 28, 1957, Ser. No. 662,269

11 Claims. (Cl. 98—2)

This invention relates generally to motor vehicles and particularly to the register used in connection with the air circulation system in the vehicle.

The present invention is directed to a novel register through which cooled or heated air may be discharged into the rear seat passenger compartment of a motor vehicle. The particular embodiment illustrated in the drawings is mounted on the inside of front door edge. It embodies a universal action lever which controls a set of vertical front louvers and a plurality of horizontal rear louvers. The louvers may be actuated independently of each other or simultaneously as desired. A further provision is made by which the rear louvers may be actuated to close off the air supply through the register. The register is simple in design and operation, and is easy to manufacture at reasonable cost.

Other objects and advantages of this invention will be made more apparent as this description proceeds, particularly when considered in connection with the accompanying drawings, wherein.

Figure 1:
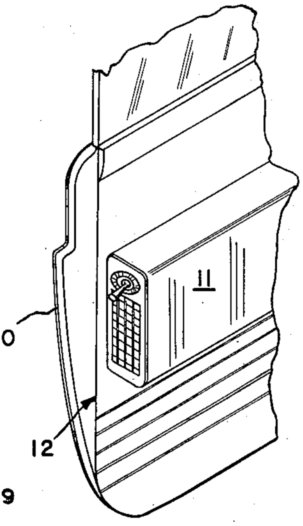
Figure 1 is a fragmentary perspective view of a motor vehicle front door embodying the present invention.

Referring now to the drawings, a fragmentary portion of a front door 10 is shown which is part of a motor vehicle. The edge of the door normally extends rearwardly beyond the front seat of the vehicle when the door is closed. Cooled or heated air from a positive source of supply (not shown) is directed through a conduit behind the door panel 11. The novel register is indicated at 12 and is secured to the conduit opening so that the air may be directed into the rear passenger compartment of the vehicle. Register 12 is provided with a substantially rectangular front frame 13 having a generally rectangular shaped opening 14 in the lower portion of the frame. The opening 14 is generally framed on the rearward side by vertical side walls 16 and horizontal walls 17. The walls 16 and 17 are provided with a plurality of slotted generally arcuate holes 18 and 19 for the purpose to be later explained.

Above the rectangular opening 14 there is provided a truncated cone inwardly shaped depression 21 having a central aperture 22 angled rearwardly outwardly with respect to the front frame 13. A pair of integral mounting pins 23 are located at the top and bottom on the rear side of the frame for securing a mating retainer 24 through which the pins extend and are peened over for securement purposes.

Retainer 24 extends the length of the frame 13 and has a pair of threaded mounting holes 26 for securing the assembly to the conduit in the front door. The sides 27 of the retainer 24 are provided with transversely disposed webs 28 and 29 which engage the walls 17 of the frame 11 and thus close the slotted holes 19 in said walls. A transverse slotted opening 31 is provided below the web 28 and a depending longitudinally extending web 32 which is angled on its rearward face 33 in a downward direction for a purpose to be later described.

Figure 4:
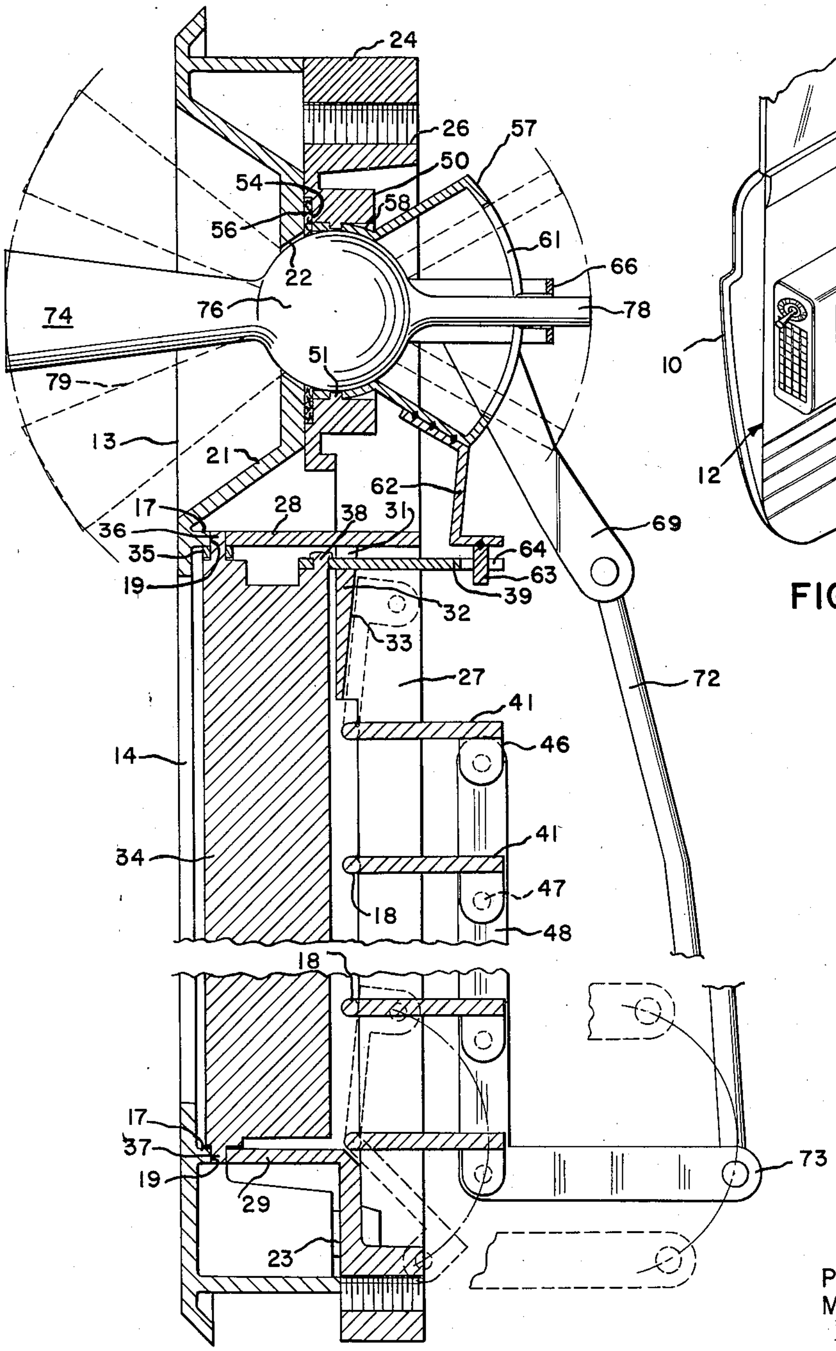
Figure 4 is a side elevational view taken on the plane indicated by the line 4—4 of Figure 3.
Figure 2:
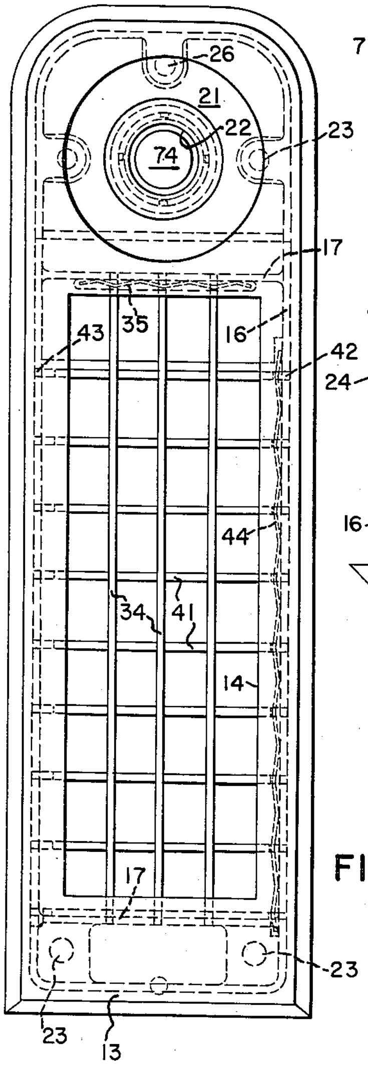
Figure 2 is a front elevational view of the invention.
Figure 3:
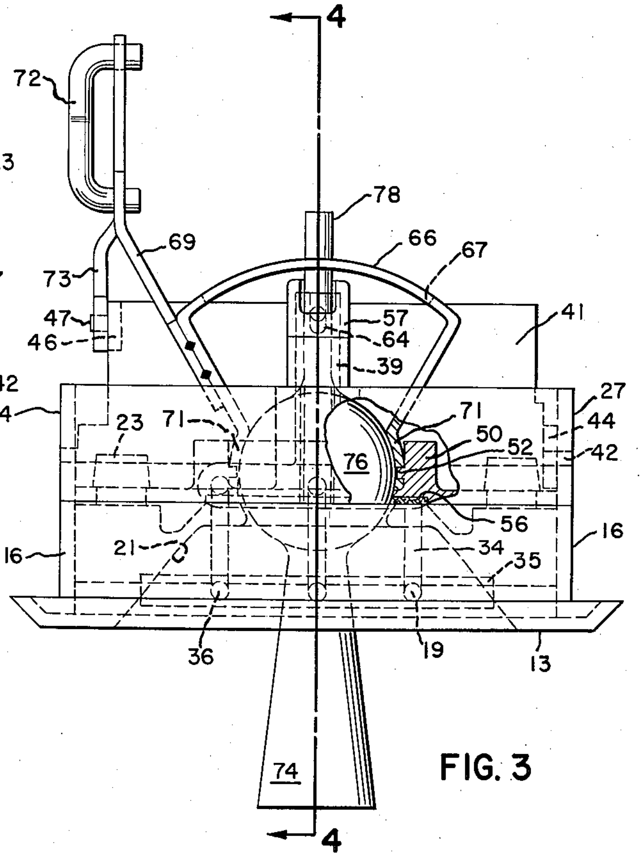
Figure 3 is a top elevational view partly in section of the structure shown in Figure 2.

As can be seen in Figures 2, 3 and 4, a plurality of longitudinally extending front louvers 34 haaing a pair of pivots defined by longitudinally extending integral bearing extensions 36 and 37 adjacent the forward edge of the louver. The upper bearing extension 36 is longer than the lower bearing extension 37 and the extensions are accordingly mounted in the slotted holes 19 in the walls 17. A prestressed bent leaf spring 35 is mounted on the upper extension 36 and maintain a pressure on the louver between the walls 17 and 28 and the louver 34. The upper part of the louvers 34 are provided with an upstanding rear extension 38 to which is secured a generally T-shaped front louver guide 39 which extends rearwardly out through the opening 31. The guide 39 is secured to the pivot 38 by peening over the edge as shown in Figure 4 and is supported by the transverse rib 32.

The arrangement for mounting the horizontal louvers 41 is similar to the mounting of the vertical louvers 34. A pair of pivot extensions 42 and 43 extend outwardly adjacent the forward edge of the louver for engagement in the slotted holes 18 of the vertical side walls 16. The extension 42 is longer than the extension 43 in order that a prestressed bent spring 44 may be mounted onto the extension 42 to provide spring pressure between the louvers 41 and the vertical side walls 16 and 27. The louvers 41 are bent inwardly and downwardly to form attachment anchors 46 which have centrally secured thereto an anchor pin 47 pivotally connecting the anchor 46 to an L-shaped rear louver plate 48. As can be seen in Figure 2, the rear horizontal louvers 41 may be pivoted about the axis of the extensions 42 and 43 in an upward and downward arcuate movement.

Figure 5:
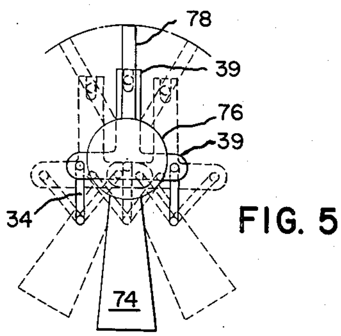
Figure 5 is a fragmentary view of a portion of Figure 3 and illustrates the vertical louver adjustment.

In axial alignment with the angled apertures 22, the retainer is provided with a generally hub shaped flange 50 which has depending vertical lugs 51 and horizontal inwardly extending lugs 52. Lugs 51 and 52 are arranged at 90° to each other. A recessed annular slot 54 is provided in the hub adjacent the angled apertures 22 for the installation of a felt washer 56 which extends inwardly beyond the edge of the hub. A generally U-shaped louver yoke 57 has its arcuate formed mounting legs 58 apertured for journaling to the vertical lugs 51. The closed section of the yoke 57 is slotted longitudinally at 61. A depending arm 62 is secured to the lowermost leg 58 and has a mounting pin 63 which is positioned in the open slot 64 of the front louver guide 39. In Figure 5, it can be seen that the lateral movement of the yoke 57 about its axis 51 will likewise move the guide 39 in a lateral arcuate direction thus angling the front louvers 34 as may be desired.

A horizontally disposed rear louver yoke 66 is secured to the horizontal mounting lugs 52 by its arcuate mounting legs 71 and has its closed end slotted at 67. A depending link 69 is secured to the lowermost mounting leg 71 and depends downwardly as shown in Figure 4. At its lowermost point the link 69 is apertured to receive the end of the rear louver rod 72 which is staked to said link. The other end of the rod 72 is staked likewise to the apertured lower leg 73 of the plate 48. It can thus be seen that the vertical movement of the yoke 66 about the horizontal axis defined by the lugs 52 will result in the arcuate movement of the horizontal louvers 41.

Actuation of both the front and rear yokes is provided by the incorporation of a lever 74 having a ball like portion 76 located within the confines of the mounting legs 58 and 71 of the front and rear yokes respectively. The rearward portion of the mounting legs being arcuately formed correspondingly restrain the ball like section 76 of the lever from axial movement. An extension 78 is axially aligned with the lever 74 and projects through the slots 64 and 67 respectively.

It can thus be seen that the universal type action is attained with this mechanical construction in which the front or rear louvers may be actuated in whatever direction is desired or in a combination of directions. Because of the mechanical structure, it is possible to substantially determine the direction of the air going through the louvers by the position of the lever 74. The register may be closed by simply moving the lever downwardly in the position indicated at 79 at which time the horizontal louvers will strike face 33 and effectively close the register.

It will be understood that the invention is not to be limited to the exact construction shown and described, but that various changes and modifications may be made without departing from the spirit and scope of the invention, as defined in the appended claims.

What is claimed is:

1. In a motor vehicle having a passenger compartment, a positive air supply and means for conducting the air from the positive air supply to the passenger compartment, that improvement of an air register for controlling the air entering said passenger compartment, comprising an outer frame member which constitutes the forward face of the register and an inner frame member which constitutes the rearward portion of the register, means securing said members in edge abutting relationship, an air hole in said frame members, attachment means for securing said frame members to the air supply conducting means, a plurality of vertical louvers, each of said vertical louvers having extensions at their upper and lower ends, holes in the edge of one of said frame members adjacent to the edge of the other of said frame members adapted to receive said vertical louver extensions for pivotal movement, a plurality of horizontal louvers, each of said horizontal louvers having extensions at their outer ends, holes rearwardly of the vertical louvers in the edge of one of said frame members adjacent to the edge of the other of said frame members adapted to receive said horizontal louver extensions for pivotal movement, a manual adjustment lever, aligned apertures in said frame members arranged to receive said lever for universal movement between said inner and outer frame members and connecting means pivotally secured to the lever and the vertical and horizontal louvers respectively for simultaneously positioning said louvers upon movement of the adjustment lever.

2. In a motor vehicle having a front and rear passenger compartment, a forwardly hinged front door on each side of the front passenger compartment, said door ending aft of the front passenger compartment, a positive air supply and conduit means for conducting the air through the front door aft of the front passenger compartment, an improved air register comprising an outer frame member which constitutes the forward face of the register and an inner frame member which constitutes the rearward portion of the register, an air hole in said frame members, attachment means for securing said frame members to each other in edge abutting relationship and additional attachment means for securing said frame members to the air supply conduit means, a plurality of vertical louvers, each of said vertical louvers having extensions at their upper and lower ends, holes in the edge of one of said frame members adjacent to the edge of the other of said frame members adapted to receive said extensions for pivotal movement, a plurality of horizontal louvers, each of said horizontal louvers having extensions at their outer ends, holes in the edge of one of said frame members adjacent to the edge of the other of said frame members adapted to receive the extensions for pivotal movement rearwardly of the vertical louvers, a manual adjustment lever, aligned apertures in said frame members adapted to receive said manual adjustment lever, means for universally mounting said manual adjustment lever in said aligned apertures, connecting means between said lever and said vertical and horizontal louvers respectively, resilient means for maintaining said vertical and horizontal louvers respectively in the position selected by the manual adjustment lever and closing means effectively stopping the travel of air through the airhole in said frame members.

3. The structure defined by claim 2 which is further characterized in that said resilient means for maintaining said vertical and horizontal louvers respectively in the position selected by the manual adjustment lever comprises a prestressed leaf spring interposed between the frame members and the vertical louver, a second prestressed leaf spring interposed between the frame members and the horizontal louvers, said spring members exerting sufficient pressure on the respective louvers to hold the louvers in the position determined by the position of the manual adjustment lever.

4. The structure defined by claim 2 which is further characterized in that said manual adjustment lever includes a ball-like portion and an extension projecting from the ball-like portion, and that said means for universally mounting said manual adjustment lever in said aligned apertures in said frame members comprises a pair of inwardly extending opposed pivot extensions on the vertical and horizontal axes respectively of the inner frame aperture, a pair of yokes having a longitudinally slotted closed end and a pair of integral mounting legs mounted on said pivot extensions, said mounting legs formed about the ball-like portion of the adjustment lever and restraining said lever from rearward axial movement, said outer frame aperture having an edge conforming generally to the ball-like portion of the adjustment lever and restraining said lever from forward axial movement, said lever having its extension projecting through the longitudinally slotted ends of the yokes and being movable universally about its ball-like portion within the confines of the yoke legs and outer frame aperture edge.

5. The structure defined by claim 4 which is further characterized in that a recessed annular slot circumferentially surrounds the inner frame aperture, sealing means disposed within said recess and extending inwardly to contact said ball-like portion, said outer frame aperture angled edge being disposed adjacent the sealing means effectively securing the sealing means in said recessed annular slot and restraining said ball-joint like portion from forward axial movement.

6. The structure defined by claim 4 which is further characterized in that said longitudinal slots in the closed ends of the yokes define the extent of travel of said adjustment lever extension, said lever extension projecting through the slots in both of said yokes respectively, one of said yokes being movable within the confines of the other.

7. The structure defined by claim 4 which is further characterized in that the longitudinal slot in the closed end of one of the yokes defines a directional travel path for one of the plurality of louvers; and a substantial portion of the longitudinal slot in the other yoke defines the directional travel path of the other plurality of louvers, a continued movement through the remaining portion of the slot defines a progressive closing position of said last mentioned louvers whereby the passage of air through the airhole in the frame members is progressively diminished until completely stopped.

8. The structure defined by claim 4 which is further characterized in that the yoke mounted on the pivot extensions on the vertical axis defines the travel of the vertical louvers, and the yoke mounted on the pivot extensions on the horizontal axis defines the travel of the horizontal louvers, and that said linkage means comprises a vertical louver guide pivotally secured at one end to the vertical louvers and having a longitudinal slot at the other end, an arm secured at one end to the yoke mounted on the vertical pivot extensions and having a pin at the other end, said pin in slidable engagement with said vertical louver guide slot, a horizontal louver plate pivotally secured at one end to the horizontal louvers, a depending link secured at one end to the yoke mounted on the horizontal pivot extensions, and a rod pivotally mounted to the other end of the depending link and the horizontal louver guide respectively.

9. The structure defined by claim 2 which is further characterized in that said closing means comprises a web extending across the airhole in the inner frame rearwardly of the vertical louvers, and that the horizontal louvers are pivotally mounted in superimposed relationship on axes which are spaced apart a distance less than the width of said horizontal louvers, the uppermost axis being located below and near the web and the lowermost axis being located adjacent the bottom of the air hole, whereupon the preselected positioning of the adjustment lever imparts movement to the horizontal louvers through said connecting means to pivotally actuate said horizontal louvers to overlie a portion of said web and each other and effectively close said airhole to the passage of air.

10. In a motor vehicle having a passenger compartment, a positive air supply and means for conducting the air from the positive air supply to the passenger compartment, that improvement of an air register for controlling the air entering said passenger compartment, comprising an outer frame member which constitutes the forward face of the register and an inner frame member which constitutes the rearward portion of the register means securing said members together, an air passage in said frame members, attachment means for securing said frame members to the air supply conducting means, a first louver having end portions which are pivotally mounted upon said frame members to control the direction of the air in a predetermined plane, a second louver having end portions which are pivotally mounted upon said frame members at a 90° angle to said first louver for controlling the air in a plane transverse to said first mentioned plane, a manual adjustment lever, means universally mounting said manual adjustment lever upon one of said frame members remote from said air passage and said louvers, linkage means connecting said adjıstment lever to the first louver and additional linkage means independent of said first mentioned linkage means connecting said adjustment lever to the second louver, one of said louvers being movable by its respective linkage to close said air passage upon a predetermined movement of said manual adjustment lever.

11. In a motor vehicle having a passegner compartment, a source of air and means for conducting the air from the source to the passenger compartment, that improvement of an air register for controlling the air entering said passenger compartment, comprising, an outer frame member that constitutes the forward face of the register and an inner frame member that constitutes the rearward portion of the register, means securing said frame members in edge abutting relationship, said frame members having an air hole, attachment means for securing said frame members to the air conducting means, a plurality of louvers, each of said louvers having an extension at its terminal end, holes in the end of one of said frame members adjacent the edge of the other of said frame members adapted to receive said extensions for pivotal movement, said louvers controlling the direction of the air in a predetermined plane, a plurality of additional louvers, each of said second mentioned louvers having an extension at its terminal end, said one of said frame members having additional holes in the end adjacent the edge of said other of said frame members, said additional holes being arranged at a 90° angle to said first mentioned hole and adapted to receive the extensions of said second mentioned louvers, said second mentioned louvers controlling the air in a plane transverse to said first mentioned plane, a manual adjustment lever, means mounting said manual adjustment lever for universal movement in one of said frame members remote from the air passage and the first and second mentioned louvers, first linkage means connecting said adjustment lever to the first mentioned louvers, and second linkage means independent of said first linkage means connecting said adjustment lever to the second mentioned louvers, said manual adjustment lever being selectively pivoted to position said first and second mentioned louvers simultaneously with respect to each other.

References Cited in the file of this patent

UNITED STATES PATENTS

| | | |
|---|---|---|
| 2,034,231 | Fox | Mar. 17, 1936 |
| 2,349,544 | Fielder | May 23, 1944 |
| 2,365,319 | Young | Dec. 19, 1944 |
| 2,391,408 | Galamb | Dec. 25, 1945 |
| 2,600,934 | Speith | June 17, 1952 |
| 2,729,158 | Wilfert | Jan. 3, 1956 |
| 2,894,441 | Boylan | July 14, 1959 |

FOREIGN PATENTS

| | | |
|---|---|---|
| 718,400 | Great Britain | Nov. 10, 1954 |
| 771,784 | Great Britain | Apr. 3, 1957 |